(12) United States Patent
Stevenson et al.

(10) Patent No.: US 11,951,946 B2
(45) Date of Patent: Apr. 9, 2024

(54) INTEGRATED ROOF ACCESS STEP

(71) Applicant: Rivian IP Holdings, LLC, Plymouth, MI (US)

(72) Inventors: Thomas Stevenson, Warwickshire (GB); Michal Holcer, Orange, CA (US); Kaitlyn Olah, Irvine, CA (US); Paula Lobaccaro, Laguna Beach, CA (US); Daniel Cheng, Huntington Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/570,454

(22) Filed: Jan. 7, 2022

(65) Prior Publication Data

US 2023/0219502 A1 Jul. 13, 2023

(51) Int. Cl.
*B60R 3/00* (2006.01)
*B60Q 3/217* (2017.01)
*B60R 3/02* (2006.01)

(52) U.S. Cl.
CPC .............. *B60R 3/005* (2013.01); *B60Q 3/217* (2017.02); *B60R 3/02* (2013.01)

(58) Field of Classification Search
CPC ........... B60R 3/005; B60R 3/02; B60R 3/007; B60Q 3/217
See application file for complete search history.

(56) References Cited

U.S. PATENT DOCUMENTS

| | | | | |
|---|---|---|---|---|
| 1,953,298 | A * | 4/1934 | Goodwin | B61D 23/02 280/166 |
| 3,915,475 | A * | 10/1975 | Casella | B60R 3/02 182/120 |
| 4,056,270 | A * | 11/1977 | Greenfield | B60R 3/00 280/166 |
| 4,750,753 | A * | 6/1988 | Dezern | B60R 3/02 224/497 |
| 8,905,354 | B2 * | 12/2014 | Griffiths | B64C 1/24 182/89 |
| 10,106,086 | B1 * | 10/2018 | Eckstein | B62D 25/04 |
| 2003/0081423 | A1 * | 5/2003 | Shinji | B60Q 1/325 362/509 |
| 2004/0207224 | A1 * | 10/2004 | Miller | B60R 3/02 296/57.1 |
| 2008/0100023 | A1 * | 5/2008 | Ross | B60R 3/002 280/166 |
| 2014/0110193 | A1 * | 4/2014 | Conley | B60R 3/02 182/91 |
| 2015/0217683 | A1 * | 8/2015 | Salter | B60Q 3/68 362/546 |
| 2020/0238915 | A1 * | 7/2020 | Gray | B60R 3/02 |

* cited by examiner

*Primary Examiner* — Frank B Vanaman
(74) *Attorney, Agent, or Firm* — Foley & Lardner LLP

(57) ABSTRACT

An integrated roof step to enable an individual to access the roof of a vehicle. The integrated roof step includes a support member configured to support an object; a socket configured to be disposed in a door frame of a vehicle body, wherein the socket is configured to at least partially receive the support member such that a door of the vehicle is closable without the support member interfering with the vehicle door; and a mount configured to movably secure a portion of the support member to the socket.

15 Claims, 10 Drawing Sheets

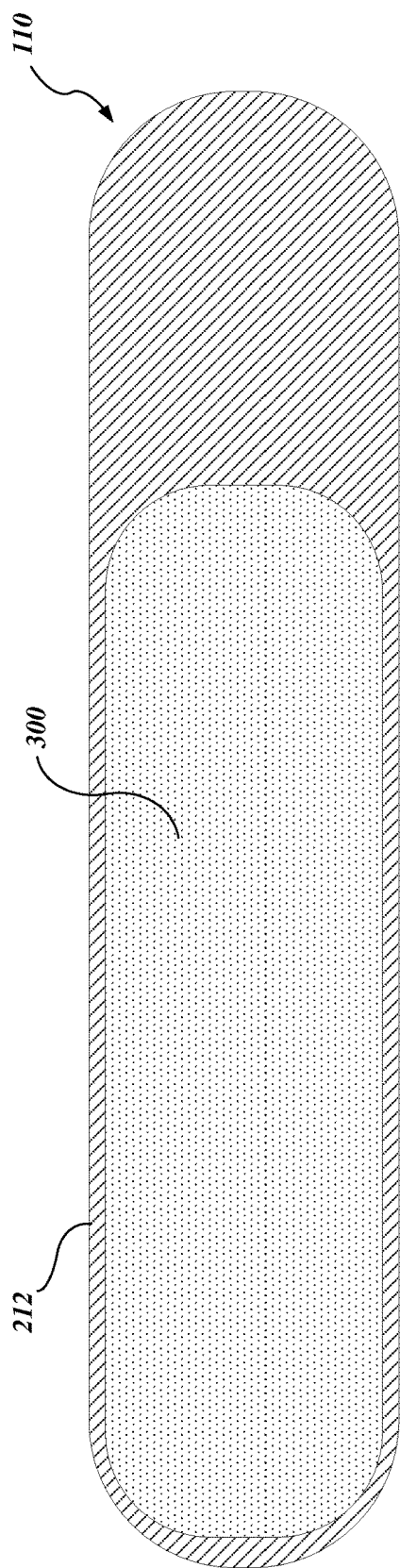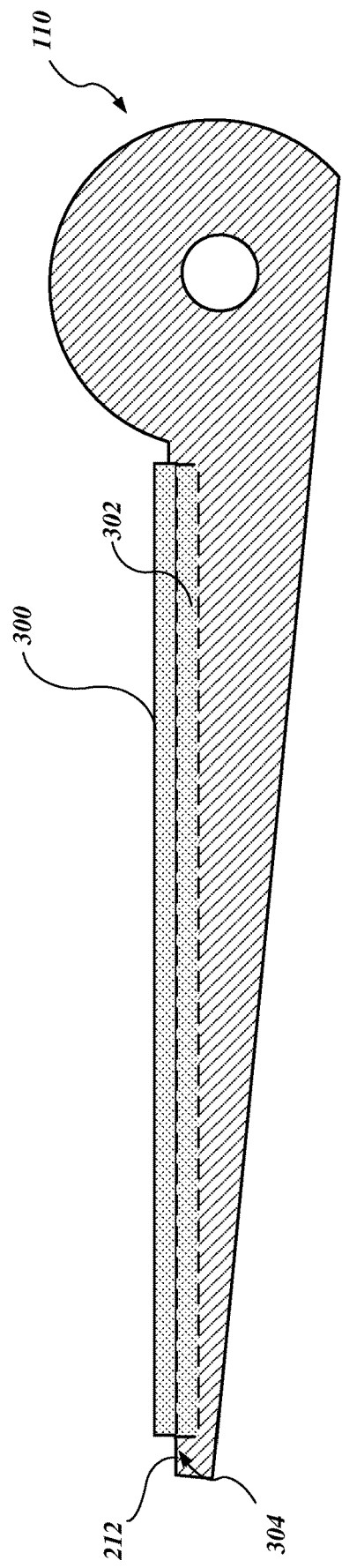

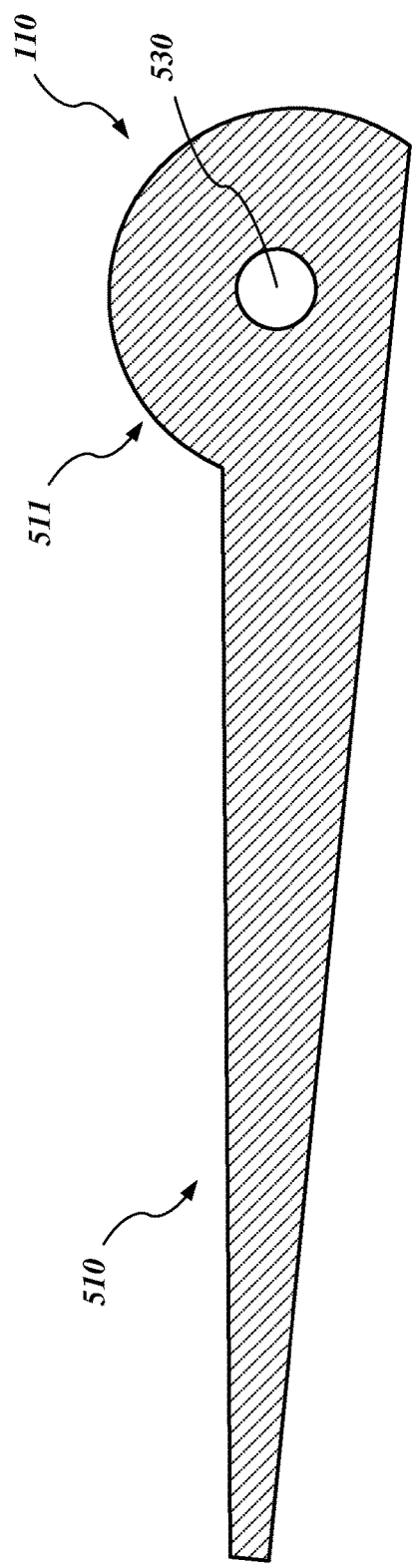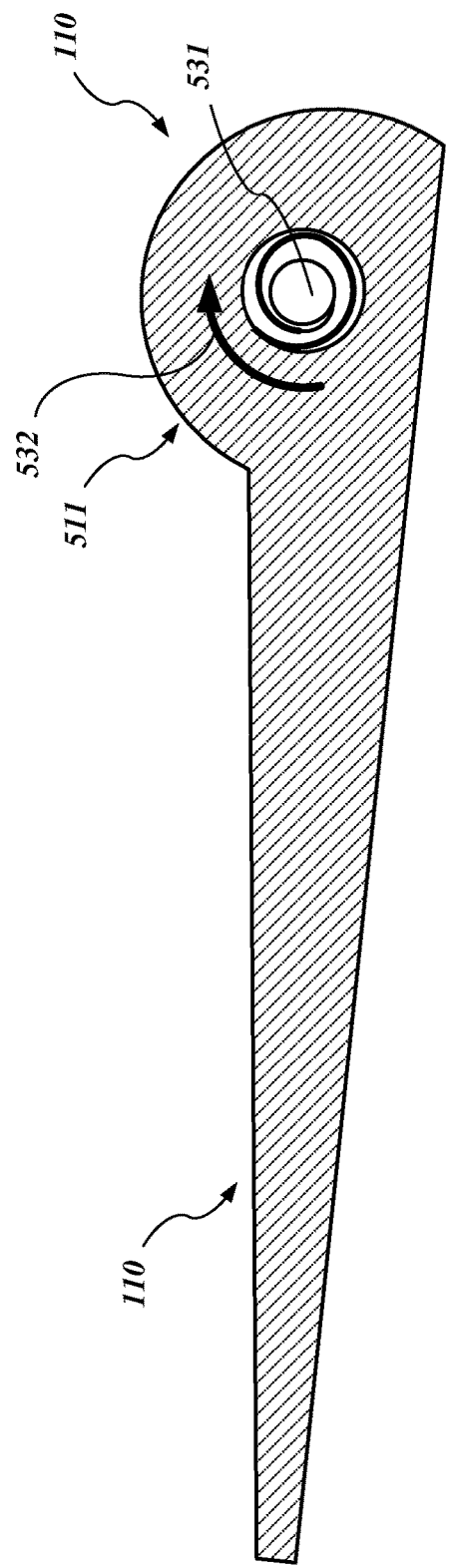

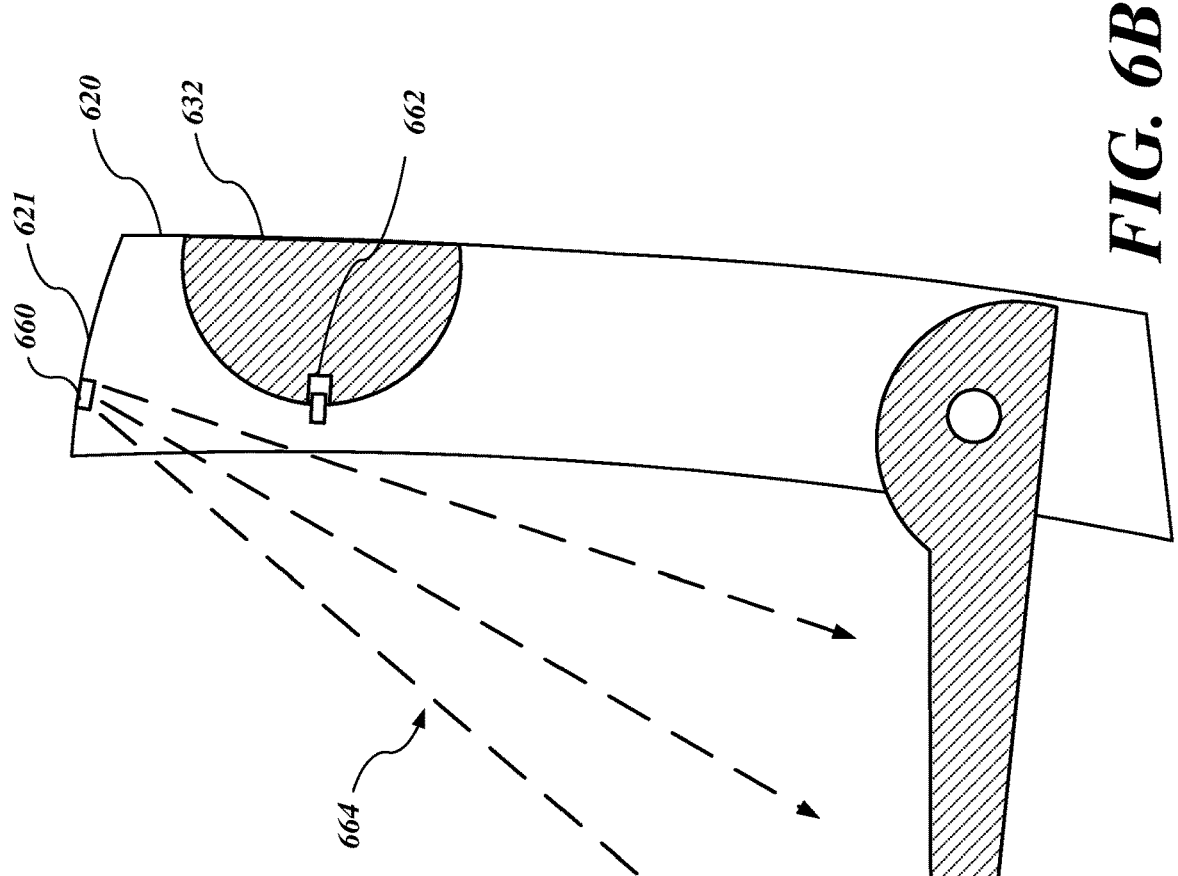
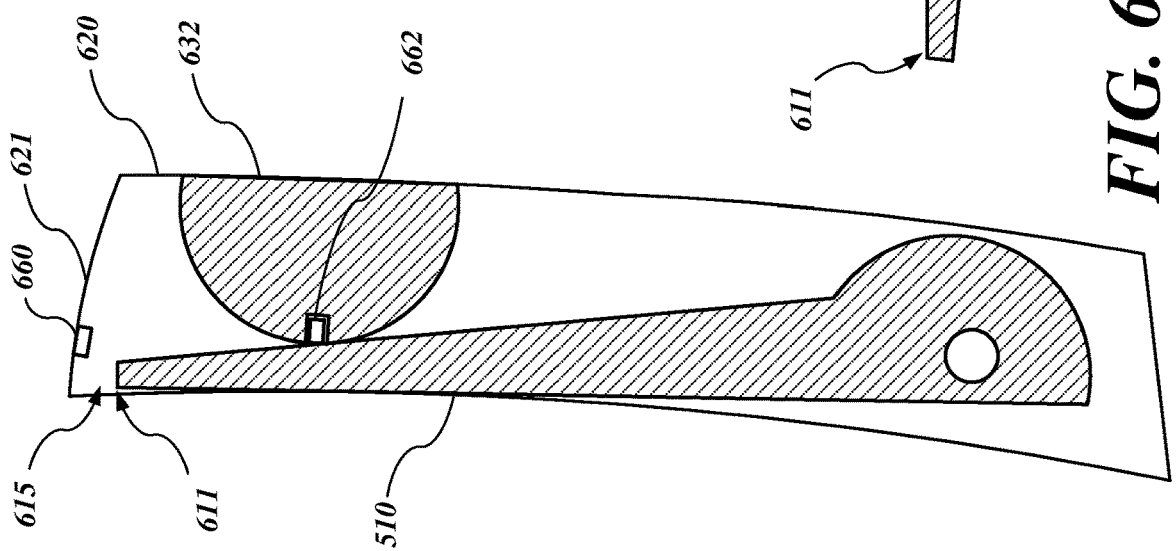
FIG. 6A
FIG. 6B

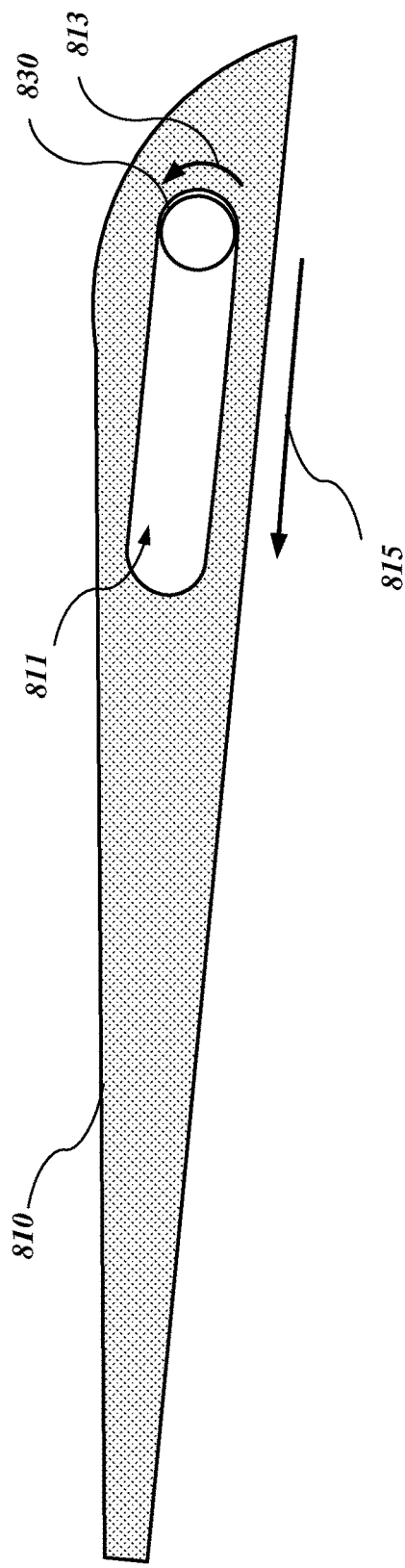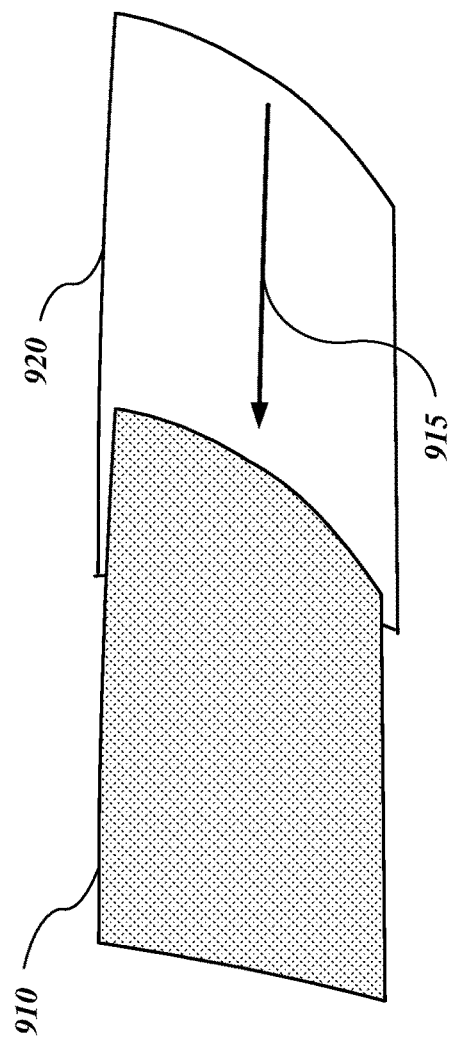
FIG. 8
FIG. 9

INTEGRATED ROOF ACCESS STEP

INTRODUCTION

It is often desirable to be able to transport items on the roof of a vehicle, such as bicycles, kayaks, or cargo stored in roof-top carriers. However, it is difficult for many individuals to be able to readily reach the roof of their vehicles—particularly higher profile vehicles, such as sport utility vehicles and trucks—to secure or retrieve their items. Some individuals try to stand on the lower edge of the door frame, use steps that hang off of a door latch hook, or resort to standing on a stepstool or other external object to reach the roof of their vehicle. These options may not provide enough reach, may be unsafe to stand on, and/or their use may result in damage to the finish or the body of the vehicle.

The statements in this section merely provide background information related to the present disclosure and may not constitute prior art.

SUMMARY

Disclosed embodiments include apparatuses, vehicles, and methods for providing an integrated step to enable an individual to access the roof of a vehicle without resorting to use of an external device or trying to stand on another portion of the vehicle, both of which may be unsafe to the individual and to the vehicle.

In an illustrative embodiment, an apparatus includes: a support member configured to support an object; a socket configured to be disposed in a door frame of a vehicle body, where the socket is configured to at least partially receive the support member such that a door of the vehicle is closable without the support member interfering with the vehicle door; and a mount configured to movably secure a portion of the support member to the socket.

In another illustrative embodiment, an apparatus includes a support member configured to support an object when the support member is moved into a deployed position; a socket configured to be disposed within a door frame of a vehicle body configured to receive a vehicle door in a closed position, where the socket is configured to at least partially receive the support member therein when the support member is in a stowed position to avoid the support member from interfering with closing of the vehicle door within the door frame; and a mount configured to movably secure a portion of the support member to the socket to enable the support member to be selectively moved between the stowed position and the deployed position.

In a further illustrative embodiment, a method includes: providing a support member configured to physically support an appendage of a user when the support member is moved into a deployed position; and movably mounting the support member within a socket disposed within a door frame of a vehicle body that is configured to receive a vehicle door, where the support member is selectively movable out of the socket into the deployed position to support the appendage of the user and is receivable within the socket without obstructing closure of a door.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 3A and 3B are top-down and side views, respectively, of a support member incorporating a slip-resistant element;

FIGS. 5A and 5B are side views of support members that include a rotatably-mounted elongated member;

FIGS. 6A and 6B are side views in partial cutaway form of a support apparatus including an internal stop and a lighting device;

FIG. 8 is a side view of a support member that is rotatably and slidably movable relative to its mount;

FIG. 9 is a side view in partial cutaway form of a support member that is slidable relative to a socket.

DETAILED DESCRIPTION

The following description explains, by way of illustration only and not of limitation, various embodiments. By way of a non-limiting introduction and overview, in various embodiments, an apparatus includes a support member configured to support an object, such as an appendage of a user or another object, when the support member is moved into a deployed position. For example, the support member may provide a step on which an individual can climb to access a roof or other overhead surface of the vehicle. A socket built into or installed within a door frame of a vehicle body that receives a vehicle door when the vehicle door is in in a closed position. The socket is configured to at least partially receive the support member within when the support member is in a stowed position. Thus, the support member may be deployed to provide a step to access the roof or other overhead surface of the vehicle but then may be stowed in the socket so as not to interfere with the closing of the vehicle door. A mount movably secures a portion of the support member to the socket, such as by rotatably mounting the support member to the mount, to enable the support member to be selectively moved between the stowed position and the deployed position.

Now that a general overview has been given, details of various embodiments will be explained by way of non-limiting examples given by way of illustration only and not of limitation.

Figure 1A:
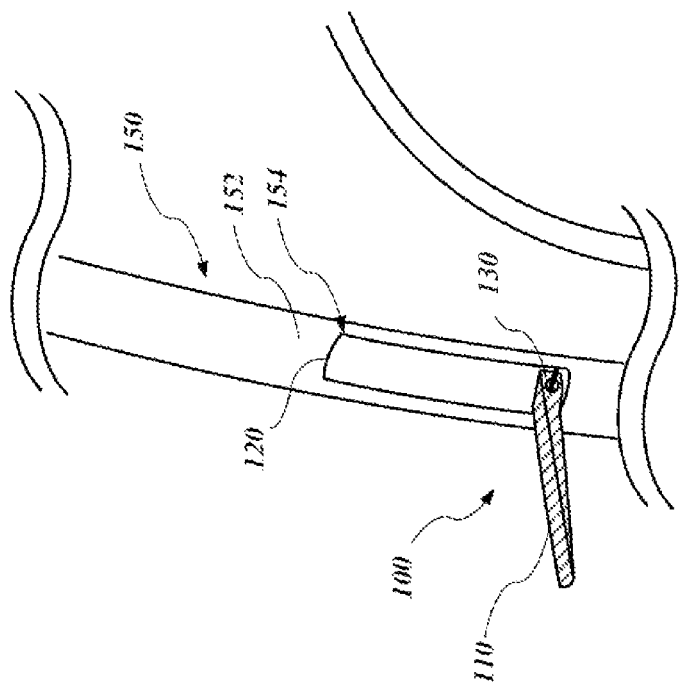
FIGS. 1A and 1B are perspective views of an embodiment of a support apparatus in deployed and stowed positions, respectively.

Referring to FIG. 1A, an illustrative integrated, stowable support apparatus 100 is disposed in a vehicle body 150. In various embodiments, the support apparatus 100 is disposed in a door frame 152 of the vehicle body 150. The support apparatus 100 includes a support member 110 that is rotatably coupled to a socket 120 at a mount 130. In various embodiments, the socket 120 is an integral portion of the door frame 152 of the vehicle body 150 or the socket 120 is a separate, attachable socket that is received within a recess 154 of the door frame 152, as further described below. The support member 110 is rotated into a deployed position in which the support member 110 extends in a generally horizontal direction parallel with the surface on which the vehicle rests (not shown in FIG. 1A). In the deployed position, the support member 110 thus provides a step or other support on which an individual can step or otherwise place an appendage or object. The support member 110 thus may allow the individual to move vertically to, for example, reach the roof of the vehicle (not shown in FIG. 1A), as further described below or to provide a place to rest an object.

Figure 1B:
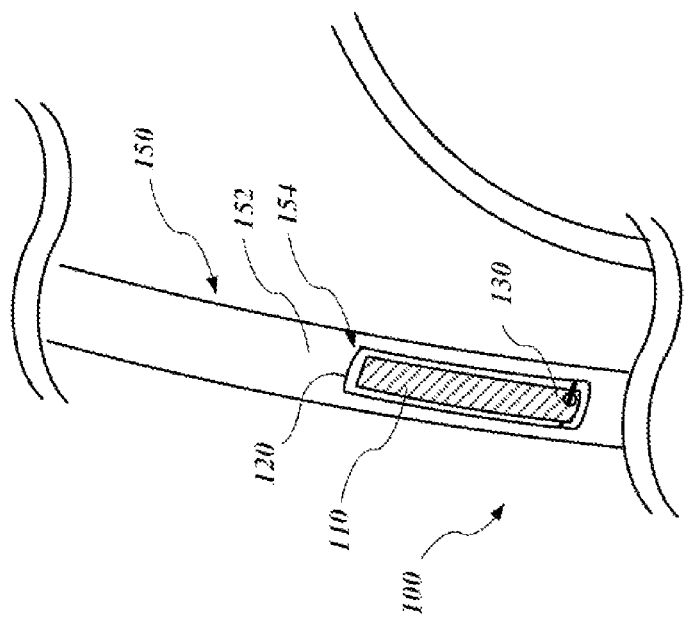

Referring to FIG. 1B, the support member 110 is rotated about the mount 130 to a stowed position in which the support member 110 is received within the socket 120. As a result, in the stowed position, the support member 110 does not extend from the door frame 152 and, thus, does not obstruct access into the passenger compartment or interfere with a vehicle door (neither are shown in FIG. 1B) being closed and received within the door frame 152.

In various embodiments, in addition to the support member 110 being rotated between the deployed and stowed positions, the support member 110 also may be extensible. For example, the support member 110 may include a channel that rotates and slides across the mount 130 to a deployed position to effectively extend a length of the support member 110. In various embodiments, the support member 110 also may be slidable in and out of the socket 120 between its stowed and deployed positions, respectively. Embodiments are not limited to any particular type of movable mounting of the support member 110 relative to the socket 120.

Figure 2A:
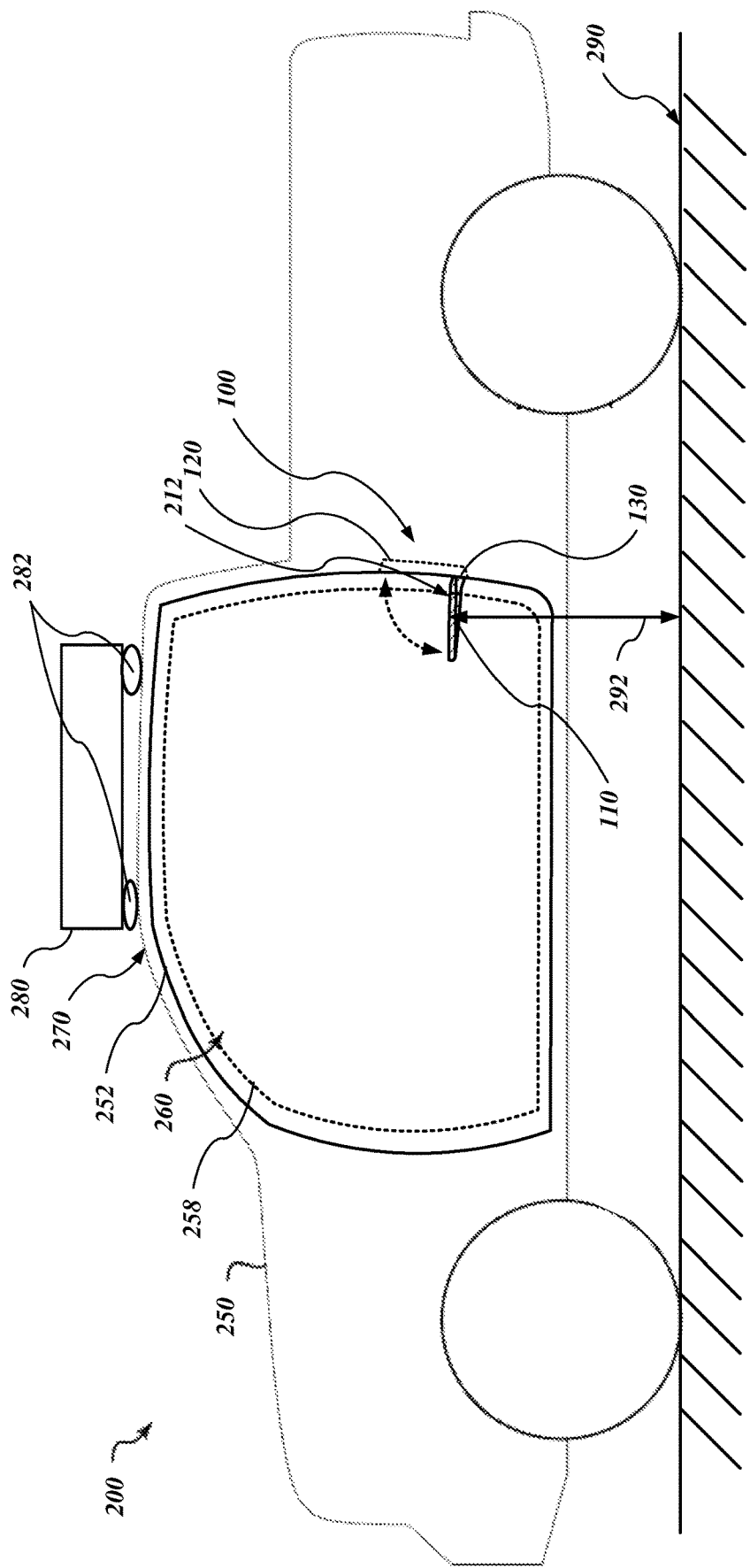
FIGS. 2A and 2B are side views in partial cutaway form of a vehicle incorporating the support apparatus of FIGS. 1A and 1B.

Referring to FIG. 2A, a vehicle 200 includes a vehicle body 250 that includes a vehicle cabin 260 that may receive an operator, one or more passengers, and/or cargo. The vehicle body 250 has a roof or other overhead surface(s). It will be appreciated that, depending on the height of the vehicle 200 and/or the height of an individual (not shown in FIG. 2A), the individual may or may not be able to reach the roof 270 while standing on the ground or other surface 290 on which the vehicle 200 rests. As a result, the individual may or not be able to secure an object 280 to or retrieve the object 280 from the roof 270. The object 280, which may include a single object or multiple objects stored in a carrier, may be attached to the roof through the use of roof rails 282 or another type of roof rack.

The vehicle body 250 includes a door frame 252 that is configured to sealably receive a vehicle door 258 (shown in dotted lines) configured to permit access to the vehicle cabin 260. In various embodiments, the vehicle door 258 is hingeably attached to the door frame 252 and/or the vehicle body 250 to permit the vehicle door 258 to be opened and closed. With the vehicle door 258 open, the support apparatus 100 disposed in the door frame 252 may be accessed to allow an individual to rotate the support member 110 about the mount 130 or otherwise move the support member 110 relative to the mount 130 from a stowed position (FIG. 1B) within the socket 130 to a deployed position (FIG. 1A).

In the deployed position, the support member 110 extends in a generally horizontal direction to provide a step surface 212 on which an individual can rest a foot or other appendage. Using the step surface 212, the individual may be able to better reach the roof 270 of the vehicle 200. In the embodiment of FIG. 2A, for example, the step surface 212 is at a height 292 above the ground 290 from which an individual may be able to more readily access the roof 270 of the vehicle.

Figure 2B:
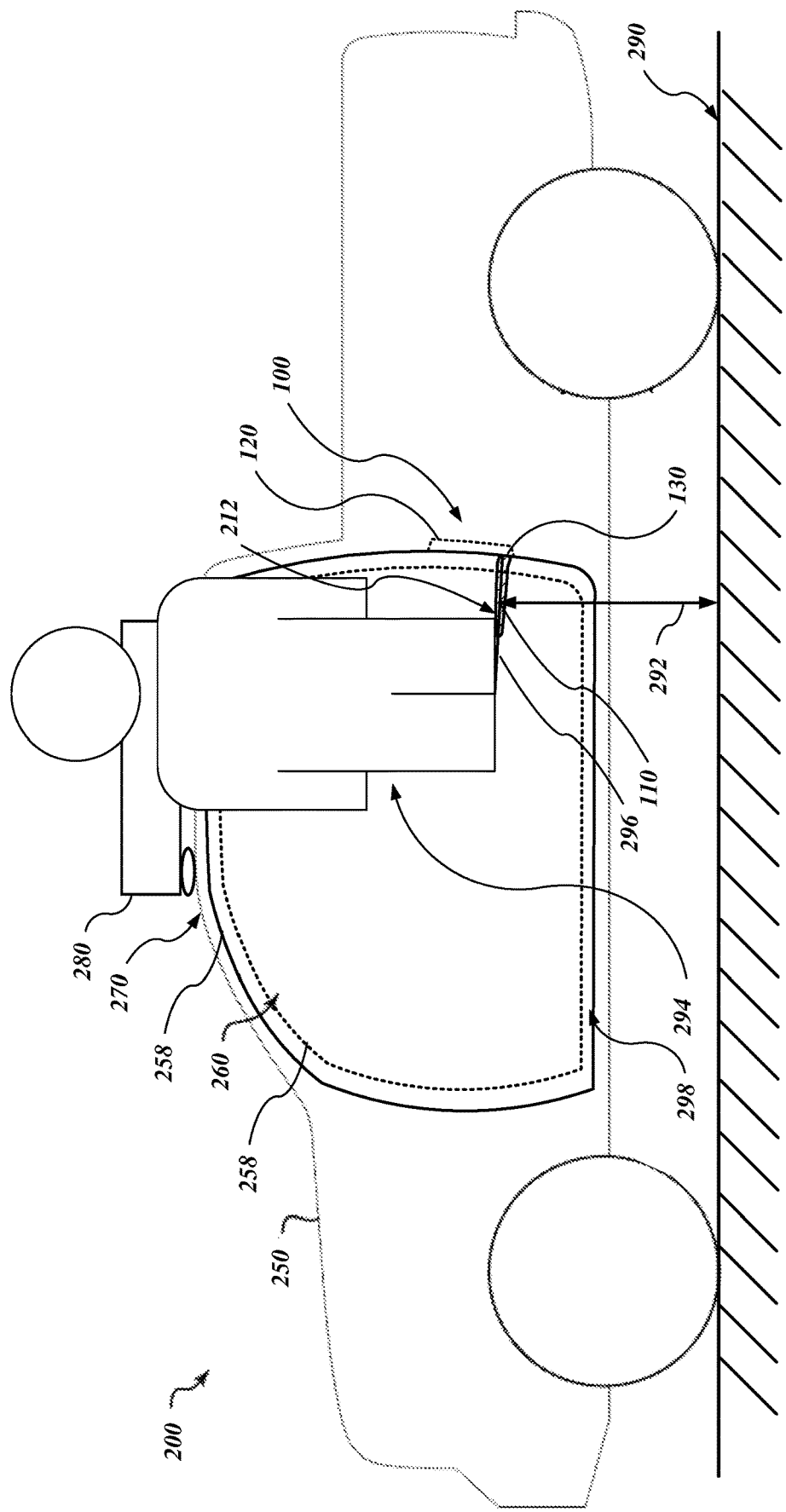

Referring to FIG. 2B, an individual 294 stands on the step surface 212 on the support member 110 of the support apparatus 100. The individual 294 rests a foot 296 or other appendage on the step surface 212, raising the appendage 296 to the height 292 of the step surface 212. Thus, in various embodiments, the support apparatus 100 enables the individual 294 to access the roof 270 of the vehicle without using an external object, such as a step ladder or other body (not shown) or a separate device that attaches to the vehicle 200. Moreover, in various embodiments, the step surface 212 at the height 296 may be higher than a lower edge 298 of the door frame 252, thus making it easier for the individual to access to the roof 270. In both cases, use of the support apparatus 100 may reduce a risk of damage to the finish or body of the vehicle 200 if the external object or separate device should impact the vehicle body 250. Similarly, being coupled to the vehicle body 250, the step surface 212 of the support apparatus 100 may present a more secure platform on which the individual 294 may stand, as compared an external object or support device that may tip or the lower edge 298 of the door frame 252, which may be angled and/or slippery.

Referring to FIGS. 3A and 3B, in various embodiments, the safety of standing on the support member 110 may be enhanced by equipping the step surface 212 with a slip-resistant element 300. The slip-resistant element 300 may be adhered or otherwise fastened to the step surface 212 and may include a roughened or otherwise textured material or a rubberized material to enhance a grip of an appendage (not shown in FIGS. 3A and 3B) relative to the step surface 212. The slip-resistant element 300 also may include an insert that may include an inset portion 302 (shown in dashed lines in FIG. 3B) that is received within a surface 304 of the step surface 212 of the support member 110. Thus, the slip-resistant element 300 may enhance the grip or traction of an appendage on the step surface 212 to prevent sliding or slipping of the appendage.

Figure 4B:
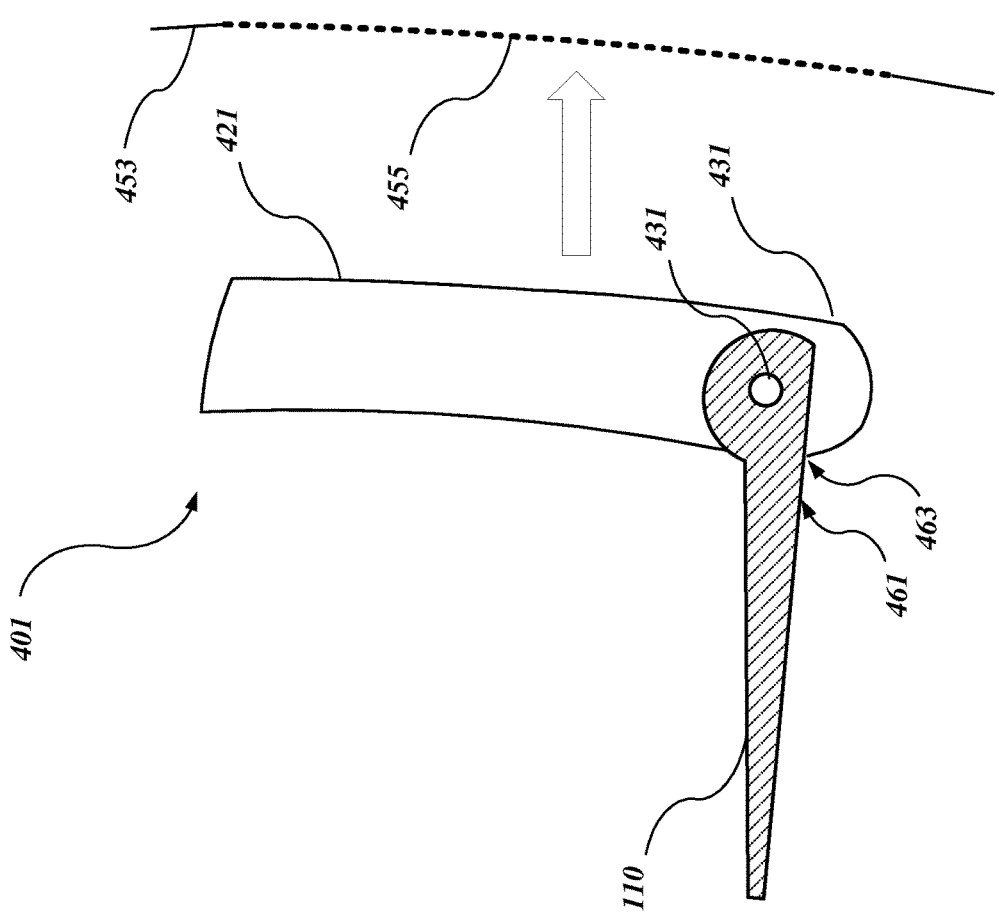
FIGS. 4A and 4B are side views in partial cutaway form of a support apparatus integrally-formed with a door frame and attachable within a door frame, respectively.
Figure 4A:
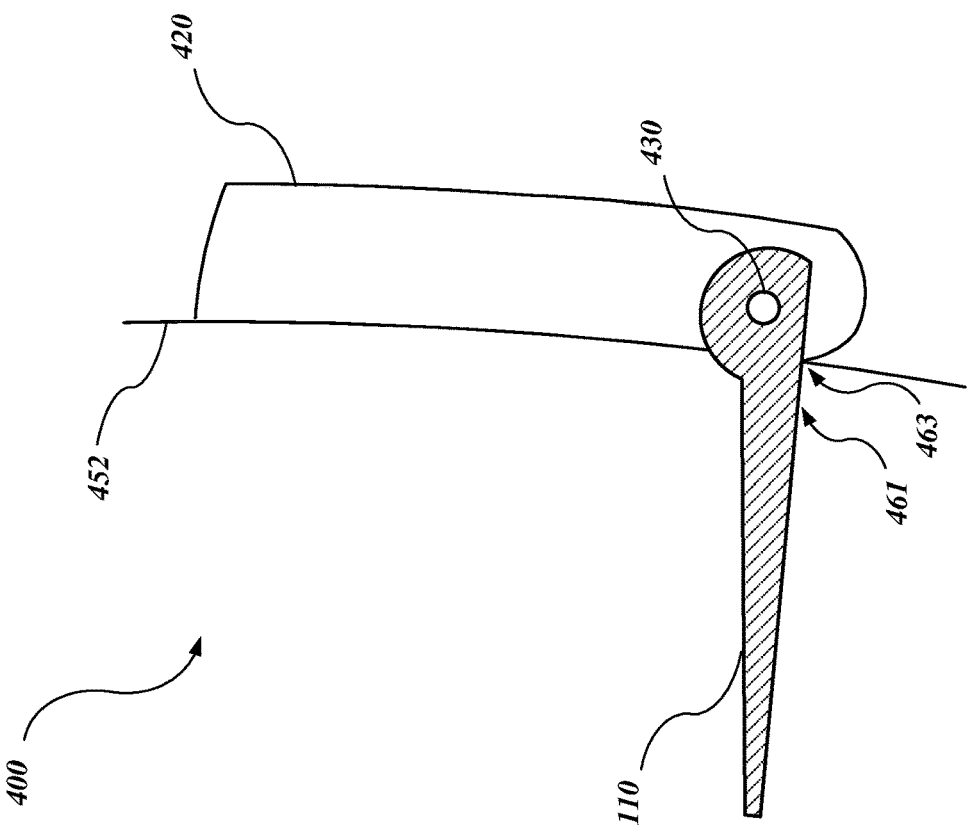

Referring to FIGS. 4A and 4B, in various embodiments, the socket 120 of the support apparatus 100 may be integrally built into or otherwise formed within the door frame of a vehicle or may include a separate, attachable structure that is configured to be installed within the door frame. Referring specifically to FIG. 4A, in various embodiments an integrated support apparatus 400 within a door frame 452 (as part of a vehicle body) includes an integrally-formed socket 420. The socket 420 includes or is configured to receive a mount 430 about which the support member 110 may be rotationally mounted or otherwise movably mounted to be moved between a stowed position and a deployed position. As previously described with reference to FIG. 1B, in the stowed position, the support member 110 is received within the socket 420 so as not to obstruct access to the vehicle cabin or interfere with closing of a vehicle door (not shown in FIG. 4A).

Referring specifically to FIG. 4B, in various embodiments a separate support apparatus 401 includes a separate socket 421 that is formed separately from the door frame 453. The socket 421 includes or is configured to receive a mount 431 about which the support member 110 may be rotatably mounted (or otherwise movably mounted) to be moved between a stowed position and a deployed position. As previously described with reference to FIG. 1B, in the stowed position, the support member 110 is received within the socket 421 so as not to obstruct access to the vehicle cabin or interfere with closing of a vehicle door (not shown in FIG. 4A). In various embodiments, the door frame 453 may be specially formed with a recess 455 configured to receive the socket 421. In various embodiments, the recess 455 may be specially formed to frictionably or, with other attachment devices (not shown) fixably receive the socket 451 into the recess 455 for attachment to the door frame 453.

In various embodiments, whether using an integrated support apparatus 400 or a separate support apparatus 401, the door frame 452 or 453, respectively, may be reinforced to provide structural support to the socket 420 or 421, respectively. The reinforcement may prevent damage to the door frame 452 or 453 resulting from the force or moments applied by the weight of an individual standing on the support member 110. The weight of an individual (and the weight of objects lifted by the individual) may impart more acute force to the door frame 452 or 453 in a vertical dimension at the location of the support apparatus 400 or 421 than may be anticipated to be imparted to a typical vehicle door frame.

It will be appreciated that, whether using an integrated support apparatus 400 or a separate support apparatus 401, an underside 461 of the support member 110 and an edge 463 of the socket 420 or 421 may engage when the support member 110 is in a deployed position. Interengagement of the underside 461 of the support member 110 and the edge 463 of the socket 420 or 421 maintains the support member in the deployed position when the support member 110 is loaded by an appendage or other body. It also will be appreciated that the support member 110 may be maintained in the deployed position by interengagement of stops on the support member 110 and the mount 430 or 431, by other interengagement of the support member 110 with the socket 420 or 421, or by other structures to maintain the support member 110 in the deployed position 110 when loaded.

Embodiments of the support apparatus as herein described may take various forms. Referring to FIGS. 5A and 5B, in various embodiments as previously illustrated, one embodiment of the support apparatus 100 includes a support member 110 that includes an elongated member 510 that is rotatably secured to the socket (not shown in FIGS. 5A and 5B) at a proximal end 511 of the elongated member 510. In various embodiments, as represented in FIG. 5A, the mount 530 may include a pin received within the proximal end 511 of the support member 110 and about which the support member 110 rotates. As previously illustrated, with the elongated member 510 rotatably secured to the socket (not shown) at the mount 530 at the proximal end 511, the support member 110 rotatable outwardly from the socket and downwardly into the deployed position. As previously described, the support member 110 also may be movably coupled to the mount 530 to also enable the support member to slide or otherwise move relative to the mount 530 instead of or in addition to being rotatably coupled with the mount 530.

Additionally, in various embodiments as represented in FIG. 5B, the support apparatus may include a return mechanism to restore the support member 110 to a stowed position when not in use. For example, a biased mount 531 may include a spring-loaded cylinder and/or a damped spring-loaded cylinder. When the support member 110 is not being used, the biased mount 531 may cause the support member 110 to rotate in an upward direction 532 to return the support member 110 to the stowed position when the support member 110 is not loaded. In various embodiments, the biased mount 531 may impose a minimal biasing force or the force may be dampened. As a result, after the support member 110 has been rotated into the deployed position, the support member 110 may be slowly rotated into the stowed position to give an individual a moment to engage the support member 110 before it is stowed. Using such a mechanism, the support member 110 may be automatically returned to the stowed position to reduce the risk of a vehicle door being closed on the support member when it is in the deployed position.

Referring to FIGS. 6A and 6B, when a support apparatus includes the elongated member 510, a socket 620 (whether the socket is integrated into the vehicle body or is a separate structure) may include an interior stop 632 to limit the rotation or other movement of the elongated member 510 in the stowed position. By limiting the rotation or other movement of the elongated member 510 in the stowed position, a gap 615 is maintained between a distal end 611 of the elongated member 510 and an adjacent wall 621 of the socket 620. The gap 615 may make it easier for an individual to use a digit or implement (not shown) to engage the distal end 611 of the elongated member 510 in order to rotate and/or otherwise move the elongated member 510 into the deployed position.

Referring additionally to FIG. 6B, the socket 620 may include a lighting device 660 to illuminate the elongated member 530. In various embodiments, the lighting device may be triggered by a normally-open contact switch 662 incorporated in the interior stop 632 so that, when the elongated member 510 is rotated away or otherwise moved away from the interior stop 612, the normally-open contact switch 662 is closed, activating the lighting device 660 to cast illumination 664 (represented by dashed lines) on the elongated member 510 in the deployed position. It will be appreciated that other mechanical, optical, or other switching arrangements could be used to activate the lighting device 660.

Figure 7B:
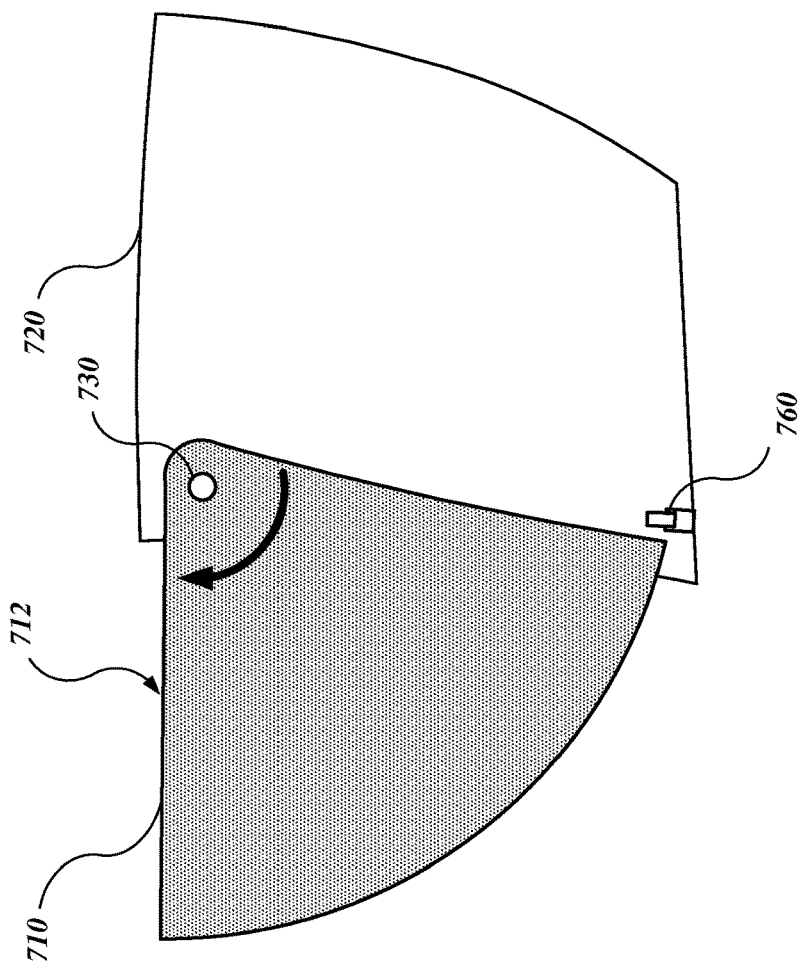
FIGS. 7A and 7B are side views in partial cutaway form of another embodiment of a support apparatus in deployed and stowed positions, respectively.
Figure 7A:
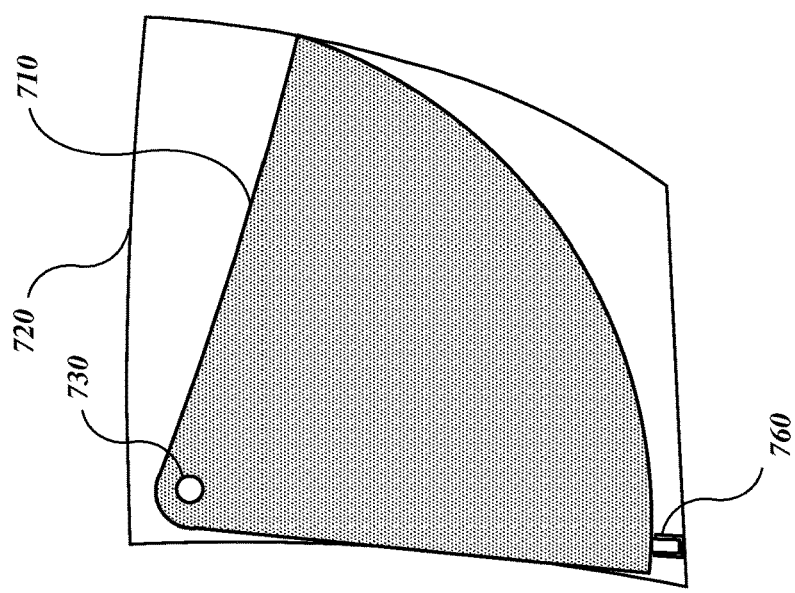

It will be appreciated that the support apparatus may be implemented in a number of forms other than the rotatable elongated member as previously described with reference to FIGS. 1A-6B. Referring to FIGS. 7A and 7B, for example, the support apparatus 700 may include a wedge-shaped member 710 that is rotatably or otherwise movably secured to a socket 720 at a mount 730 at an upper end of the wedge-shaped member 710. The support member 730 may be configured to be rotated or otherwise moved outwardly and upwardly from a stowed position within (FIG. 7A) the socket 730 into the deployed position (FIG. 7B) to present a step surface 712 on which an appendage may be supported. In various embodiments, the support member 710 may be maintained in the deployed position by a latch 760 (whether manually engageable or spring-mounted) on either the support member 710 or the socket 730 that locks the support member in place relative to the socket 730 when the support member 710 is rotated or otherwise moved into the deployed position.

As previously described, the support member may be movable relative to its mount rotatably and/or slidably. For example, referring to FIG. 8, a support member 810 may include a channel 811 that is configured to both rotate in a direction 813 and slide in a direction 815 relative to its mount 830 to be deployed. For another example, referring to FIG. 9, a support member 910 may be purely slidable in a direction 915 out of its socket 920 to be deployed.

Figure 10:
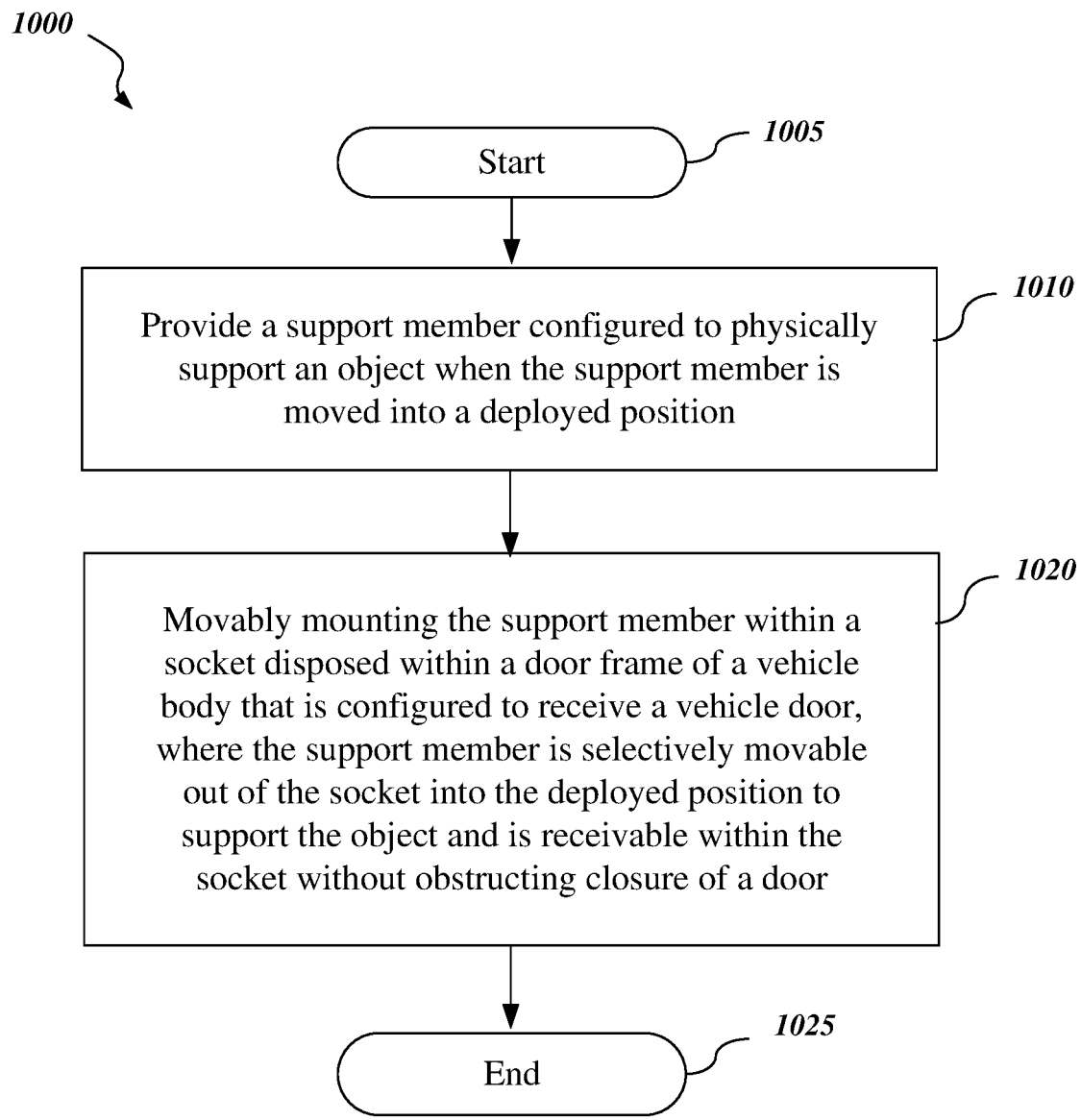
FIG. 10 is a flow chart of an illustrative method of providing a support apparatus.

Referring additionally to FIG. 10, an illustrative method 1000 is provided for providing a support apparatus as herein described. The method begins at a block 1005. At a block 1010, a support member is provided where the support member is configured to physically support an appendage of a user when the support member is moved into a deployed position. At a block 1020, the support member is movably mounted within a socket disposed within a door frame of a vehicle body that is configured to receive a vehicle door, where the support member is selectively movable out of the socket into the deployed position to support the appendage of the user and is receivable within the socket without obstructing closure of a door. The method 1000 ends at a block 1025.

It will be appreciated that the apparatus includes several individual aspects.

A support member may be configured to support an object and to be mountable within a door frame. The support member may be rotatably mountable to the door frame or a socket within the door frame, slidably mountable within the socket, or insertable into the socket. The support member may include a step surface which, in various embodiments, may be configured to support an appendage, such as a user's foot. The support member may include a slip-resistant element configured to prevent lateral slippage of an object or appendage.

A mount may be configured to rotatably secure a support member to a socket within a door frame, such as a door frame within a vehicle body. The mount may be configured to enable the support member to rotate outwardly from the socket in either an upward or a downward direction.

A door frame may be configured to receive or to define a socket to receive a support member to support an object. The socket may be integrally formed with the door frame or may be a separate object that is configured to be received within an opening in the door frame. The socket may be configured to receive a mount to permit rotatable mounting of a support member, as previously described. In various embodiments, the socket is formed so as not to obstruct closing of a door coupled with the door frame and/or to permit the support member to be received within the socket so as not to obstruct the closing of the door.

A door assembly may include a door frame and a door mountable to the door frame. The door frame may be configured to receive or to define a socket to receive a support member to support an object. The socket may be integrally formed with the door frame or may be a separate object that is configured to be received within an opening in the door frame. The socket may be configured to receive a mount to permit rotatable mounting of a support member, as previously described. In various embodiments, the socket is formed so as not to obstruct closing of the door and/or to permit the support member to be received within the socket so as not to obstruct the closing of the door.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
a support member including an elongated member to rotatably secure with a socket of the apparatus via a mount;
the support member configured to support an object; and
the support member configured to rotate outwardly from the socket and downwardly from a stowed position to a deployed position;
the socket configured to dispose in a door frame of a vehicle body; the socket configured to receive at least at least a portion of the support member such that a door of the vehicle is closable without the support member interfering with the vehicle door; and
the socket including an interior stop to engage the support member in the stowed position to maintain a gap between the elongated member of the support member and the socket;
the mount configured to movably secure the elongated member of the support member with the socket to rotate the support member between the stowed position and the deployed position; and
a lighting device to produce light to illuminate the support member;
the lighting device to produce light responsive to a disengagement between the elongated member of the support member and a sensor of the interior stop with the elongated member of the support member in the deployed position; and
the lighting device to halt production of light responsive to a reengagement between the elongated member of the support member and the sensor of the interior stop with the elongated member of the support member in the stowed position.

2. The apparatus of claim 1, wherein the support member is extendable in a generally horizontal direction with the support member in the deployed position.

3. The apparatus of claim 1, wherein the support member includes a step surface.

4. The apparatus of claim 3, wherein the step surface includes a slip-resistant element configured to prevent slippage of an appendage relative to the step surface.

5. The apparatus of claim 1, wherein the lighting device is configured to illuminate the support member when the support member is in the deployed position.

6. The apparatus of claim 1, further comprising a retraction device configured to return the support member from the deployed position to the stowed position.

7. The apparatus of claim 1, wherein the socket is chosen from at least one receiving structure chosen from an integrally formed socket built into the door frame and an attachable socket configured to be installed within the door frame.

8. The apparatus of claim 1, comprising:
the sensor including a contact switch configured to:
control the lighting device to produce light with the elongated member of the support member disengaged from the switch assembly; and
control the lighting device to halt production of light with the elongated member of the support member engaged with the switch assembly.

9. An apparatus comprising:
a support member including an elongated member to rotatably secure with a socket of the apparatus via a mount;
the support member configured to support an appendage when the support member is moved into a deployed position; and
the support member configured to rotate outwardly from the socket and downwardly from a stowed position to a deployed position;
the socket configured to be dispose within a door frame of a vehicle body;
the socket configured to receive at least a portion of the support member to avoid the support member from interfering with closing of a vehicle door within the door frame; and
the socket including an interior stop to engage the support member in the stowed position to maintain a gap between the elongated member of the support member and the socket;
the mount configured to movably secure the elongated member of the support member with the socket to selectively rotate the support member between the stowed position and the deployed position; and
a lighting device to produce light to illuminate the support member;
the lighting device to produce light responsive to a disengagement between the elongated member of the support member and a sensor of the interior stop with the elongated member of the support member in the deployed position; and
the lighting device to halt production of light responsive to a reengagement between the elongated member of the support member and the sensor of the interior stop with the elongated member of the support member in the stowed position.

10. The apparatus of claim 9, wherein the support member includes a step surface configured to extend in the generally horizontal direction when the support member is in the deployed position.

11. The apparatus of claim 10, wherein the step surface includes a slip-resistant element configured to prevent lateral slippage of the appendage relative to the step surface.

12. The apparatus of claim 9, wherein the socket is chosen from at least one receiving structure chosen from an integrally formed socket built into the door frame and an attachable socket configured to be installed within the door frame.

13. The apparatus of claim 9, wherein the lighting device is configured to illuminate the support member when the support member is in the deployed position.

14. A method comprising:
providing a support member including an elongated member to rotatably secure with a socket via a mount;
the support member configured to physically support an object when the support member is moved into a deployed position; and
the support member configured to rotate outwardly from the socket and downwardly from a stowed position to a deployed position;
movably mounting the support member within the socket, the socket configured to dispose within a door frame of a vehicle body;
the socket configured to receive at least a portion of the support member without obstructing closure of a door; and
the socket including an interior stop to engage the support member in the stowed position to maintain a gap between the elongated member of the support member and the socket;

the mount configured to movably secure the elongated member of the support member with the socket to rotate the support member between the stowed position and the deployed position; and providing a lighting device to produce light to illuminate the support member;

the lighting device to produce light responsive to a disengagement between the elongated member of the support member and a sensor of the interior stop with the elongated member of the support member in the deployed position; and the lighting device to halt production of light responsive to a reengagement between the elongated member of the support member and the sensor of the interior stop with the elongated member of the support member in the stowed position.

15. The method of claim 14, comprising:

disposing the socket within the door frame by at least one of integrally forming the socket within the vehicle body or separately forming the socket and installing the socket within the vehicle body.

\* \* \* \* \*